United States Patent [19]
Anderson et al.

[11] 3,884,042
[45] May 20, 1975

[54] FLOATING BREAKWATER
[75] Inventors: Thomas R. Anderson, Stanwood;
Edwin E. Fortner, Everett, both of Wash.
[73] Assignee: Cascade Pacific Rim Co., Inc., Arlington, Va.
[22] Filed: Jan. 2, 1974
[21] Appl. No.: 429,707

[52] U.S. Cl. .................................................... 61/5
[51] Int. Cl. ........................................... E02b 3/06
[58] Field of Search .................. 9/8 R; 52/463, 499; 61/1 F, 5; 114/.5 F

[56] References Cited
UNITED STATES PATENTS

| 436,644 | 9/1890 | White | 61/5 |
|---|---|---|---|
| 2,927,665 | 3/1960 | Hauf | 52/463 X |
| 3,357,192 | 12/1967 | Hibarger | 61/5 |
| 3,367,077 | 2/1968 | Johnston | 52/499 X |
| 3,426,537 | 2/1969 | Chenoweth et al. | 61/5 |
| 3,751,925 | 8/1973 | Thurman | 61/1 F |

Primary Examiner—Paul R. Gilliam
Assistant Examiner—David H. Corbin
Attorney, Agent, or Firm—Seed, Berry, Vernon & Baynham

[57] ABSTRACT

A floating breakwater fabricated of a plurality of interconnected sections extending across the front of an area desired to be protected from heavy seas. Each section is made up of a plurality of parallel linear floats with tires spacedly threaded to them and perpendicular floats serving as cross ties and forming a definitive structure. The links between the sections and the joints between the adjacent floats will be made of discarded automotive tires bolted together with no contact between the bolts and the floats thereby allowing the maximum of flexibility during times of high seas enabling the breakwater to absorb the resultant stress generated thereby without damage.

13 Claims, 4 Drawing Figures

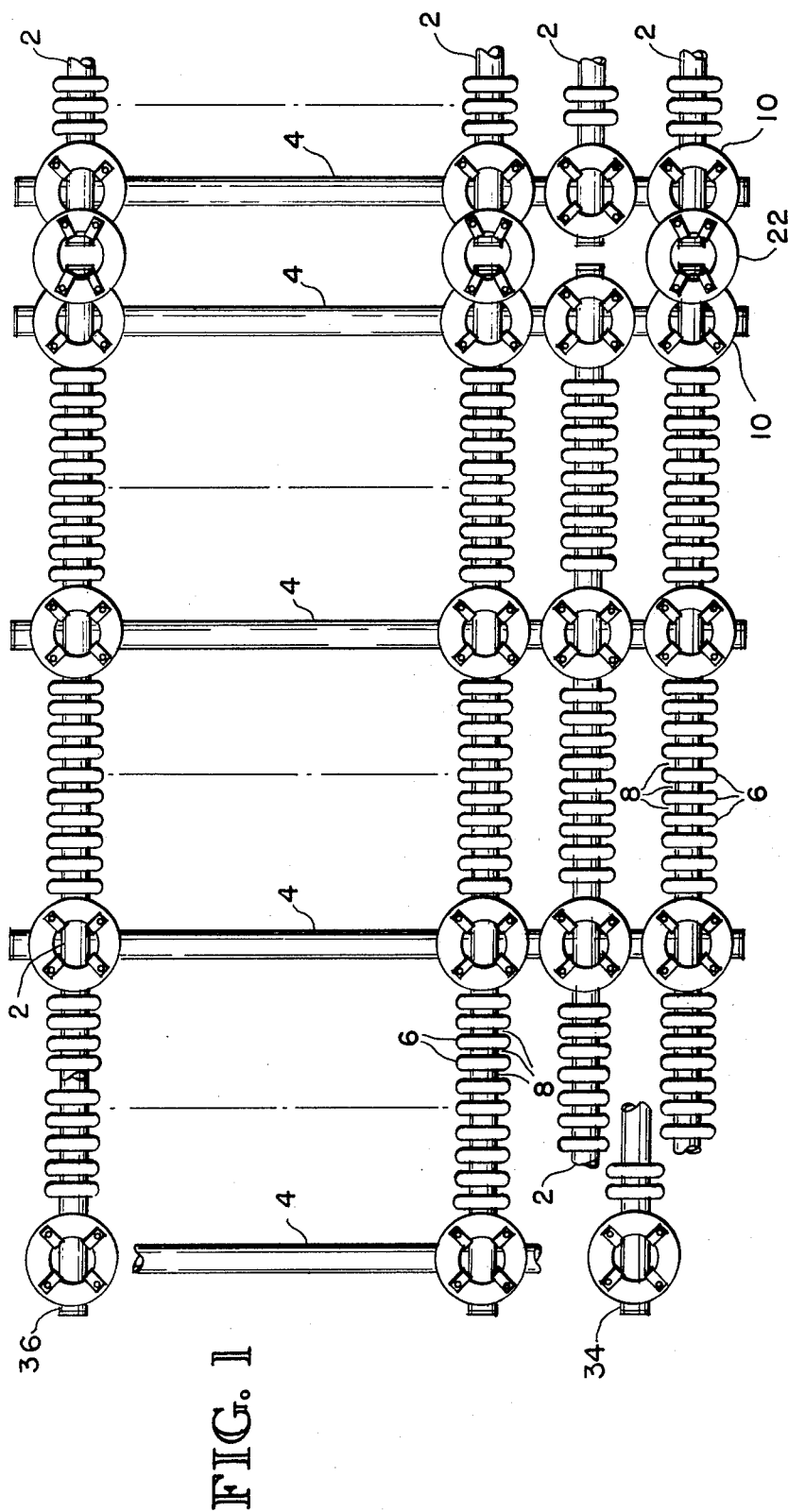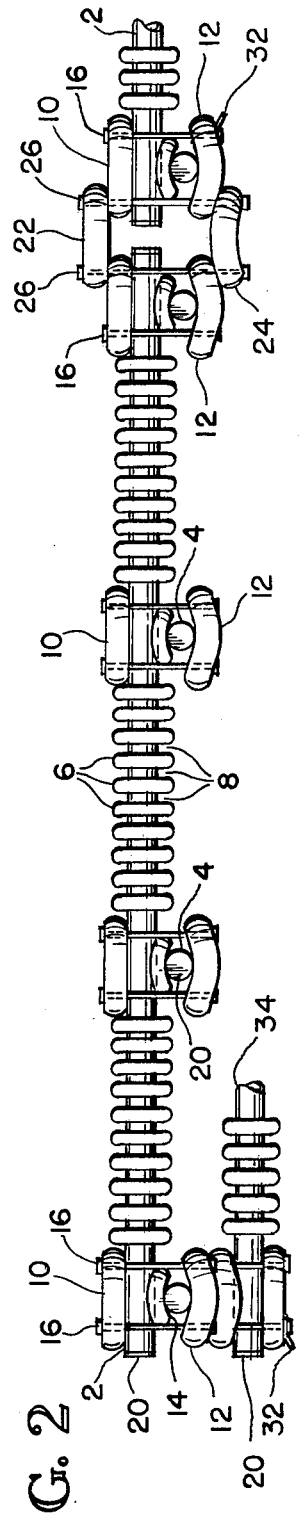
FIG. 1
FIG. 2

FLOATING BREAKWATER

BACKGROUND OF THE INVENTION

The present invention broadly deals with attenuating wave action by means of a floating breakwater. Floating breakwaters are, in the broad concept, known to be old and prior art teachings of floating breakwaters include U.S. Pat. No. 310,551 granted to Averell in 1885 dealing with torpedo-shaped log members which are anchored to the bottom of a body of water so that they may move with the wave action. U.S. Pat. No. 2,388,171 granted in 1945 to McVittie deals with another type of floating breakwater including a plurality of watertight floats which are secured together by rigid members forming a relatively large rectangular section. U.S. Pat. No. 3,237,414 granted to Stroup, et al., in March of 1966 deals with the blanket-type device which is flexible and adapted to float on the surface while extending therebelow to dampen the wave action. U.S. Pat. No. 3,276,210 granted Oct. 4, 1966 to Stitt deals with a breakwater made up of a plurality of automobile tires which are secured together in a pyramidal configuration and then suspended by cable between floats, thus providing a means of wave attenuation. U.S. Pat. No. 3,353,361 granted Nov. 21, 1967, to Lloyd deals with a breakwater comprising a rigid structure extending above the water surface and a plurality of weighted tires suspended therefrom extending downwardly into the water to break up the elliptical wave action. U.S. Pat. No. 3,357,192 granted Dec. 12, 1967, to Hybarger deals with yet another method of using tires as a breakwater, in this instance floats are utilized and the tires are secured together by means of a cable which is interwoven between the various tires, forming a device which is supported along the surface of the water. U.S. Pat. No. 3,426,537 granted Feb. 9, 1959, to Chenoweth deals with a floating log-type breakwater wherein a gridwork of logs is secured together in a rigid platform and utilizes cross-members which assure the rigidity of the structure. U.S. Pat. No. 3,487,645 granted on Jan. 6, 1967, to Frankl deals with a wave dampening device which is located above the bottom of the water and extends upwardly to the surface whereby the wave action is impeded. U.S. Pat. No. 3,691,773 granted Sept. 9, 1972, to Rolman is primarily directed at an enclosure containing water but deals with a breakwater which is secured to the bottom and extends upwardly therefrom to attentuate the wave action.

Each one of the above-noted breakwater devices, while serving to dampen the wave action during normal conditions, are either too rigid to withstand the tremendous forces incurred during inclement weather or deteriorate too quickly as a result of adverse elements encountered in situations where the breakwater is a necessary safety device.

With the above noted problems and the prior art in mind it is an object of the present invention to provide a breakwater which, to a large extent, is on the surface of the water but may alternatively extend somewhat below for additional protection.

Another object of the present invention is to provide a floating breakwater wherein the elements are extremely resistant to the normal weathering and corrosive effects expected to be encountered under the conditions requiring a breakwater.

It is another object of the present invention to provide a breakwater which although being fabricated of large sections has sufficient integral flexibility to withstand the stresses imparted to it by inclement weather without damage.

Still another object of the present invention is to provide a novel joint structure between adjoining sections of a floating breakwater wherein the joint is extremely resistant to damage, provides sufficient flexibility to allow the adjoining sections to move relative to each other during times of inclement weather and eliminates the need for contact between mutually distructive elements.

Still a further object of the present invention is to provide a novel floating breakwater wherein the main elements of the breakwater are readily available, highly resistant to the stresses expected and to a large extent are fabricated of materials which would normally be discarded. Further, the breakwater is such that in the event of the inadvertent contact with breakwater by means of a ship or boat, very little damage would be done to either the breakwater or to the contacting vessel.

BRIEF DESCRIPTION OF THE DRAWINGS

FIG. 1 is a plan view of one section of the proposed breakwater with portions broken away showing an alternative or second embodiment utilizing a portion which extends below the floating main element for installations requiring attenuation of the elliptical wave movment below the surface.

FIG. 2 is an elevational view of the breakwater of FIG. 1.

DETAILED DESCRIPTION OF THE DRAWINGS

Figure 3:
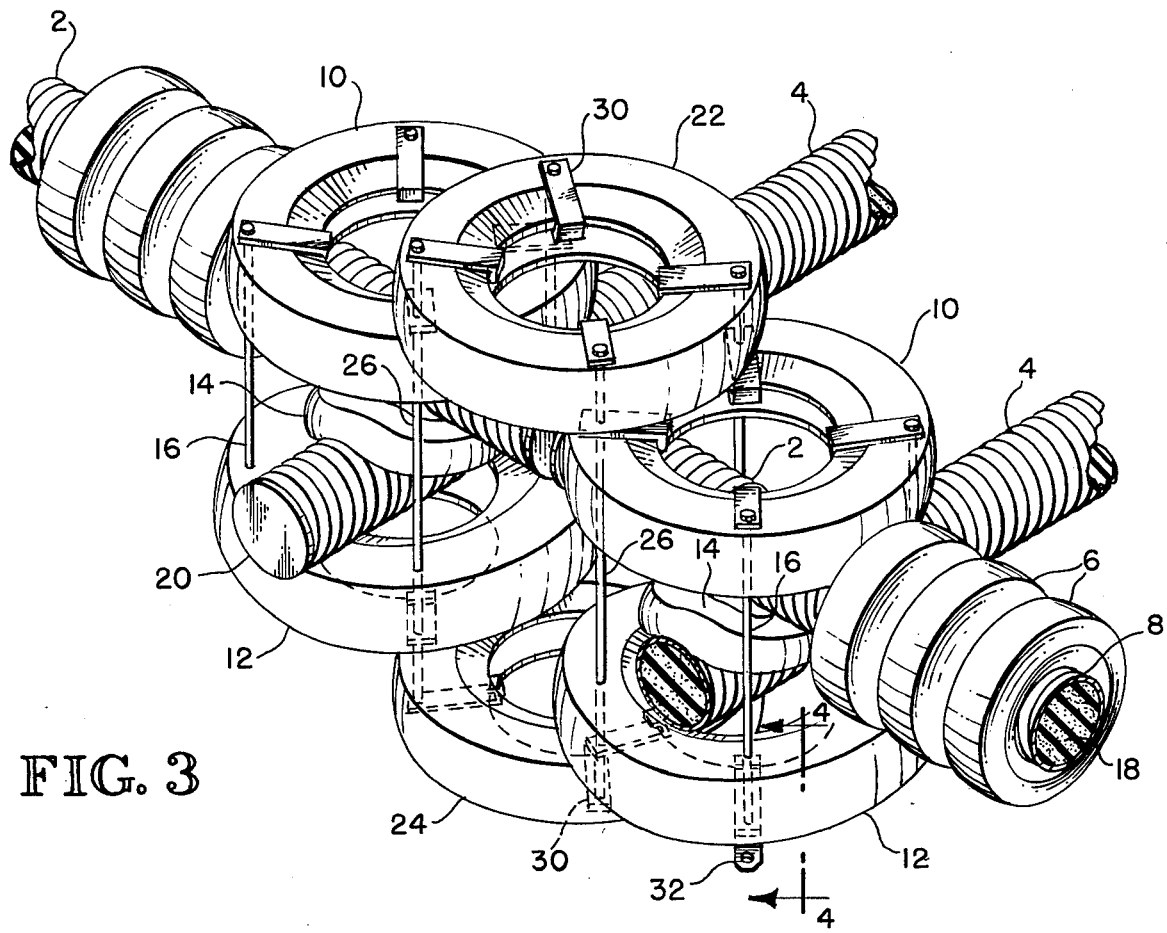
FIG. 3 is an enlarged perspective view of the novel joint structure between adjoining sections of the present invention.

As seen in FIG. 1, the main portion of the floating breakwater consists of a grid-like pattern of flotation elements 2 and transverse elements 4. The flotation elements are aluminum corrugated pipe or culvert elements which have been filled with polyurethane foam. Each of the flotation elements 2 has a plurality of tires 6 threaded thereon and held in relative position by means of spacers 8.

As best seen in FIG. 2 the main float elements 2 and the transverse elements 4 are secured together by means of a clamping action generated between a horizontally placed tire 10 on the upper surface and a similarly placed tire 12 on the lower surface. The element 2 and transverse element 4 are prevented from actual physical contact by means of an intermediate spacing tire element 14. When the various elements are located in proper position, the tires 10 and 12 are secured in position, retaining the elements by means of bolts 16 upon which tremendous downward pressure is placed. The main flotation elements 2 and the transverse elements 4, although being locked into position relative to one another because of the clamping force incurred by bolts 16 and the interaction of the tire 14 in addition to the corrugated surface upon elements 2 and 4, do not have actual physical contact by spacing the metallic elements, destructive wear is eliminated, greatly increasing the life of the unit.

Another advantage of utilizing the bolts 16 which pass through the tires 10 and 12 without contacting the corrugated flotation elements 2 and 4 is that destructive galvanic corrosion is essentially eliminated. As is well known, dissimilar metals are the greatest cause of rapid galvanic corrosion; and the tires serve as an insulator, therefor preventing electrical contact between the galvanized bolts and the aluminum casing.

As noted above, abrasive contact between elements can contribute significantly to the deterioration of the elements of a dynamic structure. In the floating state, i.e., the normal state of the inventive breakwater, the only possible abrasion on the flotation elements would be that generated between the tires and the flotation elements. Since the pipes will be made of aluminum corrugated metal which is considerably tougher than the rubber tires, it is highly unlikely that there will be any wearing effect on the aluminum material. Any wear would be black marks left by the tire or wearing of the tire. Here, again a factor which is critical is the fact that since the breakwater is floating, water will be continually available as a lubricant, thereby lessening even the abrasive effect between the tire and the flotation pipe.

Referring now to FIG. 3, the joint between adjacent sections may readily be seen. The main flotation element 2 is seen with the tires 6 threaded thereon. The urethane foam 18 fills the entire interior of the corrugated tube 2 providing adequate floatation. Because of the danger of residual liquid within the urethane foam, it is foamed within a plastic bag filling and lining the corrugated metallic cylinder. To prevent damage to the foam within the cylinder a cap 20 is supplied upon the end of each of the aluminum flotation devices.

Interconnected with the main flotation element 2 is the transverse member 4 which is likewise made of corrugated metal pipe filled with urethane foam. As explained hereinabove, interconnection between the element 2 and the element 4 is done by means of compression between tires 10 and 12 with tire 14 providing a cushioning effect between the two elements.

The interconnection between the two adjacent sections is provided by means of yet another pair of tires 22, 24 which are secured to the adjacent pair of upper tires 10 on the top if the sections and adjacent pair of lower tires 12 by means of bolts 26 which are secured in the same fashion as bolts 16 but are longer.

Figure 4:
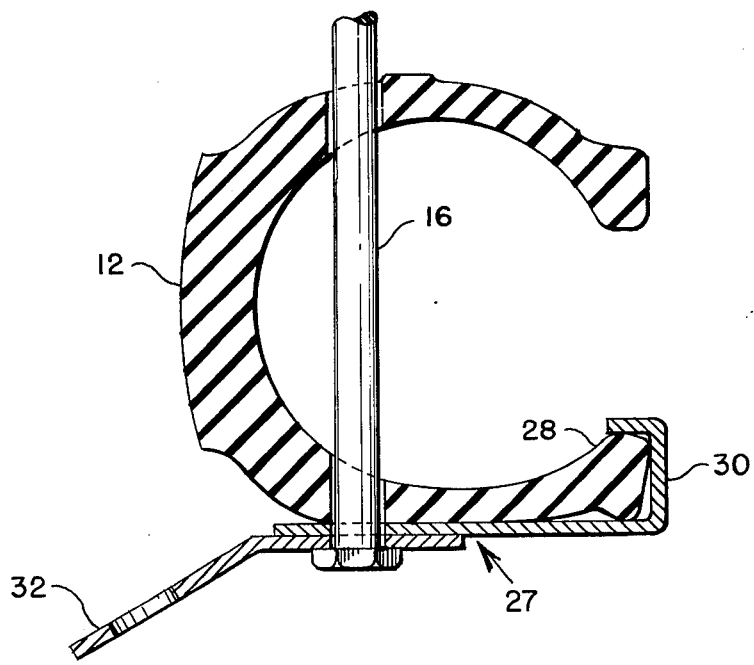
FIG. 4 is an enlarged sectional view along lines 4—4 of FIG. 3 depicting the method of securement of the tires, float elements and anchor means.

The securement between the bolts 16 or 26 and the respective tire is best seen in FIG. 4 wherein it can be seen that a single J-shaped strap 27 is secured to the bolt by means of a hole passing through the upper portion of the J and then extends around the bead 28 of the adjacent tire such that the foot 30 of the J and the bead 28 are mechanically interlocked, preventing relative movement therebetween.

Referring back now to FIG. 3, it can be seen that the combination of the various straps 27, their related bolts and the beads on the tires provide a joint and an interconnection which has structural integrity and yet sufficient flexibility to yield with the pressures generated. Further to be seen in FIG. 3 is the anchor securement means 32 which is fastened to the lower portion of bolt 26 and extends downwardly to a suitable anchor not shown.

An alternative configuration, as shown by the broken-away portions of FIG. 1, and the partial elevation of FIG. 2 includes a second level on both the front portion of the section and the rear portion of the section. As seen in these figures, the second level 34 of the front portion of the section is between the first and second horizontal elements and thus forms a triangular configuration. The second level is secured to the first level by a means similar to that shown in FIG. 3 and thus, since it would be merely repetitive, is not shown nor described in detail. The rear of the breakwater could likewise include a second level 36 which would be vertically directly below the rear boom 2 as shown in the broken-away portion of FIG. 1.

Thus it can be seen that since the wave action is broken up by attenuation rather than by reversal the present invention provides an inexpensive, effective method for providing this protection. It is to be noted that the tire 6 has been threaded upon the horizontal boom 2 and does not provide a direct path from the front to the back since the tires are alternatively spaced. The wave form must weave in and out of the tires, further dampening the effect. As has been pointed out in the references cited in the introductory portion of the present application, the wave form itself is comprised of elliptical water action and the present invention provides an effective means for attentuating this movement and results in extremely reliable structure.

The embodiments of the invention in which a particular property or privilege is claimed are defined as follows:

1. A floating breakwater to attenuate damaging wave action, comprising:
   a first floatable elongated member,
   a second floatable enlongated member,
   a plurality of outwardly extending resilient elements spacedly mounted along the length of the floatable elongated members,
   hinge means interconnecting the two floatable elongated members in an end-to-end relationship, including
   first and second sets of flexible elements of a frictional material, such that a high friction force is generated between the floatable elongated member and each flexible member, secured to the respective adjacent ends of two confronting floatable elongated members with the flexible elements of each set lying on the opposite sides of the floatable elongated member,
   means extending through the flexible elements of each set clamping them about the respective floatable elongated member, said means being spaced out of contact with the floatable elongated members,
   means flexibly interconnecting the adjacent first and second sets of flexible members and secured thereto, and
   means anchoring the end of the interconnected floatable elongated members whereby waves contacting the breakwater sections will be attenuated and the sections are capable of relative movement and yet are rugged.

2. A floating breakwater as in claim 1 wherein the floatable elongated members are corrugated aluminum tubes and the outwardly extending elements are automotive tires threaded upon the tubes.

3. A floating breakwater as in claim 1 wherein the flexible elements are automotive tires such that a high frictional force is generated and the means clamping the flexible elements around the floatable elongated member comprises a rigid threaded element extending through the flexible elements generating a clamping force without necessitating contact between the floatable elongated member and the clamping means.

4. A floating breakwater as in claim 1 wherein the floatable elongated members are hollow and include a closed cell foam substantially filling the hollow elongated member.

5. A floating breakwater as in claim 1 and including at least one other pair of floatable elongated members parallel to and spaced from the first pair.

6. A floating breakwater as in claim 5 wherein the spacing is in a horizontal plane.

7. A floating breakwater as in claim 5 wherein the spacing is in a vertical direction.

8. The floating breakwater of claim 1 said means flexibly interconnecting said first and second sets of flexible elements including a third set of flexible elements spaced above and below said first and second sets of flexible elements and elongated clamping means passing through all three sets of flexible members for clamping the sets together.

9. The floating breakwater of claim 8 further including third and fourth floatable elongated members laterally spaced from said first and second floatable elongated members, second hinge means identical to said first hinge means interconnecting said third and fourth floatable elongated members, and a plurality of transverse floatable elongated members interconnecting said first and second floatable elongated members with said third and fourth floatable elongated members.

10. The floating breakwater of claim 8 wherein said flexible elements are conventional vehicle tires.

11. The floating breakwater of claim 1, wherein said floatable elongated members are hollow and include flotation means within said hollow elongated members.

12. The floating breakwater of claim 1, at least one floatable elongated transverse member intersecting each first and second floatable elongated member, said hinge means including a frictional, resilient spacer member between each said floatable elongated transverse member and said first and second floatable elongated members.

13. An elongated floatable structure comprising;
a pair of floatable elongated elements,
flexible interconnecting means for interconnecting said elements in end-to-end alignment, said interconnecting means including,
a first set of resilient members placed upon opposite sides of a first element of the pair,
a second set of resilient members placed upon opposite sides of a second element of the pair, said first and second sets of resilient members being out of contact with the confronting ends of the elongated elements to allow relative movement of the ends,
a third set of resilient members placed upon opposite sides of and overlapping the first and second sets of resilient members, and
fastening means securing the first and second sets of resilient elements to the third set of resilient elements, limiting relative movement between but allowing restrained relative hinging movement between the elongated elements, and for clamping the first and second sets of resilient members to their respective first and second elongated elements, said fastening means being spaced from said elongated floatable elements whereby the resilient members are the only elements directly in contact with the pair of relatively movable elongated elements.

* * * * *